United States Patent
Zhu et al.

(10) Patent No.: US 10,257,450 B2
(45) Date of Patent: Apr. 9, 2019

(54) MULTI-FRAME NOISE REDUCTION METHOD, AND TERMINAL

(71) Applicant: HUAWEI TECHNOLOGIES CO., LTD., Shenzhen, Guangdong (CN)

(72) Inventors: Congchao Zhu, Beijing (CN); Zuquan Zheng, Yokohama (JP); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/124,338

(22) PCT Filed: May 15, 2014

(86) PCT No.: PCT/CN2014/077599
§ 371 (c)(1),
(2) Date: Sep. 7, 2016

(87) PCT Pub. No.: WO2015/172366
PCT Pub. Date: Nov. 19, 2015

(65) Prior Publication Data
US 2017/0019616 A1 Jan. 19, 2017

(51) Int. Cl.
*H04N 5/357* (2011.01)
*G06T 5/00* (2006.01)
(Continued)

(52) U.S. Cl.
CPC ............ *H04N 5/357* (2013.01); *G06T 5/002* (2013.01); *G06T 5/50* (2013.01); *H04N 5/21* (2013.01);
(Continued)

(58) Field of Classification Search
CPC .......... H04N 5/357; H04N 5/341; H04N 5/21; G06T 5/002; G06T 5/50; G06T 2207/20182; G06T 2207/10021
See application file for complete search history.

(56) References Cited

U.S. PATENT DOCUMENTS 7,015,954 B1 * 3/2006 Foote .................... G06T 3/4038
 348/159
9,030,528 B2 * 5/2015 Pesach .............. H01L 27/14621
 348/43
(Continued)

FOREIGN PATENT DOCUMENTS

CN 101997981 A 3/2011
CN 101997981 A 11/2011
(Continued)

OTHER PUBLICATIONS

English translation of International Search Report for International Application No. PCT/CN2014/077599, dated Feb. 2, 2015.
(Continued)

*Primary Examiner* — Timothy J Henn
(74) *Attorney, Agent, or Firm* — Kilpatrick Townsend & Stockton LLP (57) ABSTRACT

A method and a terminal are provided by various embodiments of the present invention in which: M cameras are configured to continuously shoot a same scene for K times, where M≥2, K≥2, and each of the M cameras simultaneously collects one frame of image at each time of shooting; and a processor, connected to the M cameras and configured to perform registration on images obtained at the K times of shooting, and perform temporal and spatial filtering on the registered images. In the embodiments of the present invention. Because the multiple cameras simultaneously collect an image at each time of shooting, a time interval at which a particular quantity of images are collected by the terminal
(Continued)

is shorter than that at which the particular quantity of images are collected by a single camera, and a probability of an occurrence of hand trembling or object motion within the time interval also correspondingly decreases.

16 Claims, 4 Drawing Sheets (51) Int. Cl.
G06T 5/50 (2006.01)
H04N 5/21 (2006.01)
H04N 5/341 (2011.01)

(52) U.S. Cl.
CPC ... *H04N 5/341* (2013.01); *G06T 2207/10021* (2013.01); *G06T 2207/20182* (2013.01)

(56) References Cited

U.S. PATENT DOCUMENTS

| | | | |
|---|---|---|---|
| 9,497,380 B1* | 11/2016 | Jannard | H04N 5/247 |
| 2004/0061774 A1* | 4/2004 | Wachtel | G03B 19/00 |
| | | | 348/36 |
| 2011/0096151 A1 | 4/2011 | Hulyalkar et al. | |
| 2011/0221599 A1* | 9/2011 | Hogasten | H01L 27/14609 |
| | | | 340/632 |
| 2011/0293142 A1* | 12/2011 | van der Mark | G06T 7/0028 |
| | | | 382/103 |
| 2012/0147205 A1* | 6/2012 | Lelescu | H04N 13/0029 |
| | | | 348/218.1 |
| 2012/0274818 A1 | 11/2012 | Matsuoka | |
| 2013/0038745 A1* | 2/2013 | Myokan | H04N 5/144 |
| | | | 348/208.99 |
| 2013/0063614 A1 | 3/2013 | Tsutsumi | |
| 2013/0064470 A1 | 3/2013 | Suzuki | |
| 2013/0265378 A1 | 10/2013 | Abuan et al. | |
| 2014/0139642 A1* | 5/2014 | Ni | H04N 9/09 |
| | | | 348/48 |
| 2015/0124083 A1* | 5/2015 | Attar | G06T 7/2093 |
| | | | 348/135 |
| 2016/0112641 A1* | 4/2016 | Mercier | H04N 5/23267 |
| | | | 348/208.6 |
| 2017/0099465 A1* | 4/2017 | Mullis | H04N 9/093 |
| 2017/0214866 A1* | 7/2017 | Zhu | H04N 5/359 |
| 2018/0035057 A1* | 2/2018 | McMahon | H04N 5/2171 |

FOREIGN PATENT DOCUMENTS

| | | |
|---|---|---|
| CN | 103024272 A | 4/2013 |
| CN | 103268596 A | 8/2013 |
| CN | 103685951 A | 3/2014 |
| EP | 3068124 A1 | 9/2016 |
| JP | 2007208704 A | 8/2007 |
| JP | 2012231406 A | 11/2012 |
| JP | 2013062626 A | 4/2013 |

OTHER PUBLICATIONS

Buades T et al: "A note on multi-image denoising", Local and Non-Local Approximation in Image Processing, 2009, LNLA 2009. International Workshop On, IEEE Piscataway, NJ, USA, Aug. 19, 2009, 15 pages, XP031540963.
Kostadin Dabov et al: "Video Denoising by Sparse 3D Transform-Domaincollaborative Filtering", Proceedings / EUSIPCO 2007, 15th European Signal Processing Conference : Sep. 3-7, 2007, Poznan, Poland, Poznan, Poland, Sep. 3, 2007, 5 pages, XP002596106.
European Search Report in corresponding to CN2014/077599 dated Dec. 22, 2016.
PCT Search Report in corresponding to CN2014/077599 dated Feb. 3, 2015.

* cited by examiner

MULTI-FRAME NOISE REDUCTION METHOD, AND TERMINAL

CROSS-REFERENCE TO RELATED APPLICATIONS

This application is a National Stage of International Application No. PCT/CN2014/077599, filed on May 15, 2014, which is hereby incorporated by reference in its entirety.

TECHNICAL FIELD

Embodiments of the present invention relate to the image processing field, and more specifically, to a multi-frame noise reduction method, and a terminal.

BACKGROUND

Limited by dimensions and costs of a terminal, both a lens and a sensor of the terminal are relatively small in area, and a shot image has relatively poor quality. In a night scene or a low illuminance environment, because of weak light, a shot image has even worse quality.

To improve a shooting effect of a terminal, a multi-frame noise reduction technology is gradually applied to image processing of the terminal. Specifically, first, a same scene is shot for multiple times to obtain multiple frames of images. Then, the multiple frames of images are synthesized into one frame of image by using a feature that different image noise is generated at different positions, so as to achieve an objective of noise reduction.

The multi-frame noise reduction technology requires that multiple frames of images are collected by using a single camera by means of continuous shooting. However, limited by a maximum frame rate of a terminal, a time interval at which the multiple frames of images are collected is usually relatively long. Within the time interval, if hand trembling occurs during shooting performed by a hand-held terminal, an image synthesized by collected multiple frames of images may be blurry.

SUMMARY

Embodiments of the present invention provide a terminal to improve quality of a composite image obtained after multi-frame noise reduction.

According to a first aspect, a terminal is provided, including: M cameras, configured to continuously shoot a same scene for K times, where M≥2, K≥2, and each of the M cameras simultaneously collects one frame of image at each time of shooting; and a processor, connected to the M cameras and configured to perform registration on images obtained at the K times of shooting, and perform temporal and spatial filtering on the registered images.

With reference to the first aspect, in an implementation manner of the first aspect, the M cameras are in a same plane; before performing registration on the images obtained at the K times of shooting, the processor is further configured to: acquire a translation quantity between M frames of images that are shot at each time of the K times of shooting, register the M frames of images according to the translation quantity, and generate one frame of composite image according to the registered M frames of images. The performing of registration on images obtained at the K times of shooting, and performing of temporal and spatial filtering on the registered images includes: performing the registration on K frames of composite images corresponding to the K times of shooting to determine K frames of registered images, and performing the temporal and spatial filtering on the K frames of registered images.

With reference to the first aspect or any of the foregoing implementation manner of the first aspect, in another implementation manner of the first aspect, the M cameras include a first camera and a second camera, and the M frames of images that are shot at each time include a first image and a second image that are respectively corresponding to the first camera and the second camera. In that implementation, acquire, by the processor, the translation quantity between M frames of images that are shot at each time of the K times of shooting includes acquiring a translation quantity between the first image and the second image; and registering, by the processor, the M frames of images according to the translation quantity includes: selecting the first image as a reference image, and performing a translation operation on the second image according to the translation quantity to determine a common image region of the first image and the second image.

With reference to the first aspect or either of the foregoing implementation manners of the first aspect, in another implementation manner of the first aspect, acquiring the translation quantity between the first image and the second image includes obtaining the translation quantity based on $L=(f\times(t/d))/u$, where L is the translation quantity between the first image and the second image; f is a focus length of the first camera or the second camera; t is a distance between optical centers of a lens of the first camera and a lens of the second camera; d is a pixel size of the first image, and the pixel size of the first image is the same as a pixel size of the second image; and u is a depth of field.

With reference to the first aspect or any of the foregoing implementation manners of the first aspect, in another implementation manner of the first aspect generating, by the processor, one frame of composite image according to the registered M frames of images includes: performing parallax correction on the registered M frames of images to eliminate a difference, between the registered M frames of images at a corresponding pixel, caused by a parallax between the M cameras; and generating, according to pixel values that are at the corresponding pixel and of the M frames of images obtained after parallax correction, a pixel value that is of the composite image and at the corresponding pixel.

With reference to the first aspect or any of the foregoing implementation manners of the first aspect, in another implementation manner of the first aspect, performing, by the processor, parallax correction on the registered M frames of images includes: when a difference between pixel values, at a corresponding pixel, of a $j^{th}$ frame of image in the registered M frames of images except a benchmark image and of the benchmark image is greater than a preset threshold, using the pixel value that is of the benchmark image and at the corresponding pixel to replace the pixel value that is of the $j^{th}$ frame of image and at the corresponding pixel; otherwise, keeping the pixel value that is of the $j^{th}$ frame of image and at the corresponding pixel unchanged, where the benchmark image is a frame of image in the registered M frames of images, and j is valued from 1 to M−1.

With reference to the first aspect or any of the foregoing implementation manners of the first aspect, in another implementation manner of the first aspect, before performing temporal and spatial filtering on the registered images, the processor is further configured to perform ghost removal on the registered images.

With reference to the first aspect or any of the foregoing implementation manners of the first aspect, in another implementation manner of the first aspect, K=3.

According to a second aspect, a multi-frame noise reduction method is provided, including: using M cameras on a terminal to continuously shoot a same scene for K times, where M≥2, K≥2, and each of the M cameras simultaneously collects one frame of image at each time of shooting; performing registration on images obtained at the K times of shooting; and performing temporal and spatial filtering on the registered images.

With reference to the second aspect, in an implementation manner of the second aspect, the M cameras are in a same plane; before the performing registration on images obtained at the K times of shooting, the method further includes: acquiring a translation quantity between M frames of images that are shot at each time of the K times of shooting, registering the M frames of images according to the translation quantity, and generating one frame of composite image according to the registered M frames of images. In that implementation, performing registration on the images obtained at the K times of shooting includes: performing the registration on K frames of composite images corresponding to the K times of shooting to determine K frames of registered images; and performing temporal and spatial filtering on the registered images includes: performing the temporal and spatial filtering on the K frames of registered images.

With reference to the second aspect or any of the foregoing implementation manner of the second aspect, in another implementation manner of the second aspect, the M cameras include a first camera and a second camera, and the M frames of images that are shot at each time include a first image and a second image that are respectively corresponding to the first camera and the second camera. In that implementation, acquiring the translation quantity between M frames of images that are shot at each time of the K times of shooting includes: acquiring a translation quantity between the first image and the second image. In that implementation, registering the M frames of images according to the translation quantity includes: selecting the first image as a reference image, and performing a translation operation on the second image according to the translation quantity to determine a common image region of the first image and the second image.

With reference to the second aspect or either of the foregoing implementation manners of the second aspect, in another implementation manner of the second aspect, the acquiring a translation quantity between the first image and the second image includes: obtaining the translation quantity based on $L=(f\times(t/d))/u$, where L is the translation quantity between the first image and the second image; f is a focus length of the first camera or the second camera; t is a distance between optical centers of a lens of the first camera and a lens of the second camera; d is a pixel size of the first image, and the pixel size of the first image is the same as a pixel size of the second image; and u is a depth of field.

With reference to the second aspect or any of the foregoing implementation manners of the second aspect, in another implementation manner of the second aspect, the generating one frame of composite image according to the registered M frames of images includes: performing parallax correction on the registered M frames of images to eliminate a difference, between the registered M frames of images at a corresponding pixel, caused by a parallax between the M cameras; and generating, according to pixel values that are at the corresponding pixel and of the M frames of images obtained after parallax correction, a pixel value that is of the composite image and at the corresponding pixel.

With reference to the second aspect or any of the foregoing implementation manners of the second aspect, in another implementation manner of the second aspect, the performing parallax correction on the registered M frames of images includes: when a difference between pixel values, at a corresponding pixel, of a $j^{th}$ frame of image in the registered M frames of images except a benchmark image and of the benchmark image is greater than a preset threshold, using the pixel value that is of the benchmark image and at the corresponding pixel to replace the pixel value that is of the $j^{th}$ frame of image and at the corresponding pixel; otherwise, keeping the pixel value that is of the $j^{th}$ frame of image and at the corresponding pixel unchanged, where the benchmark image is a frame of image in the registered M frames of images, and j is valued from 1 to M−1.

With reference to the second aspect or any of the foregoing implementation manners of the second aspect, in another implementation manner of the second aspect, before the performing temporal and spatial filtering on the registered images, the method further includes: performing ghost removal on the registered images.

With reference to the second aspect or any of the foregoing implementation manners of the second aspect, in another implementation manner of the second aspect, K=3.

According to a third aspect, a terminal is provided, including: M cameras, configured to continuously shoot a same scene for K times, where M≥2, K≥2, and each of the M cameras simultaneously collects one frame of image at each time of shooting; a first registration module, configured to perform registration on images obtained by the M cameras at the K times of shooting; and a temporal and spatial filtering module, configured to perform temporal and spatial filtering on the images registered by the first registration module.

With reference to the third aspect, in an implementation manner of the third aspect, the M cameras are in a same plane, and the terminal further includes: a second registration module, configured to acquire a translation quantity between M frames of images that are shot at each time of the K times of shooting, and register the M frames of images according to the translation quantity; and a synthesizing module, configured to generate one frame of composite image according to the M frames of images registered by the second registration module. In that implementation, the first registration module is further configured to perform the registration on K frames of composite images corresponding to the K times of shooting to determine K frames of registered images, and the temporal and spatial filtering module is further configured to perform the temporal and spatial filtering on the K frames of registered images.

With reference to the third aspect or any of the foregoing implementation manner of the third aspect, in another implementation manner of the third aspect, the M cameras include a first camera and a second camera, and the M frames of images that are shot at each time include a first image and a second image respectively corresponding to the first camera and the second camera. In that implementation, the second registration module is further configured to: acquire a translation quantity between the first image and the second image, select the first image as a reference image, and perform a translation operation on the second image according to the translation quantity to determine a common image region of the first image and the second image.

With reference to the third aspect or either of the foregoing implementation manners of the third aspect, in another implementation manner of the third aspect, the second registration module is specifically configured to obtain the translation quantity based on L=(f×(t/d))/u, where L is the translation quantity between the first image and the second image; f is a focus length of the first camera or the second camera; t is a distance between optical centers of a lens of the first camera and a lens of the second camera; d is a pixel size of the first image, and the pixel size of the first image is the same as a pixel size of the second image; and u is a depth of field.

With reference to the third aspect or any of the foregoing implementation manners of the third aspect, in another implementation manner of the third aspect, the synthesizing module is specifically configured to: perform parallax correction on the registered M frames of images to eliminate a difference, between the registered M frames of images at a corresponding pixel, caused by a parallax between the M cameras; and generate, according to pixel values that are at the corresponding pixel and of the M frames of images obtained after parallax correction, a pixel value that is of the composite image and at the corresponding pixel.

With reference to the third aspect or any of the foregoing implementation manners of the third aspect, in another implementation manner of the third aspect, the synthesizing module is further configured to: when a difference between pixel values, at a corresponding pixel, of a $j^{th}$ frame of image in the registered M frames of images except a benchmark image and of the benchmark image is greater than a preset threshold, use the pixel value that is of the benchmark image and at the corresponding pixel to replace the pixel value that is of the $j^{th}$ frame of image and at the corresponding pixel; otherwise, keep the pixel value that is of the $j^{th}$ frame of image and at the corresponding pixel unchanged, where the benchmark image is a frame of image in the registered M frames of images, and j is valued from 1 to M−1.

With reference to the third aspect or any of the foregoing implementation manners of the third aspect, in another implementation manner of the third aspect, the terminal further includes: a ghost removal module, configured to perform ghost removal on the registered images.

With reference to the third aspect or any of the foregoing implementation manners of the third aspect, in another implementation manner of the third aspect, K=3.

In the embodiments of the present invention, multiple cameras are installed on a terminal. Because the multiple cameras simultaneously collect an image at each time of shooting, a time interval at which a particular quantity of images are collected by the terminal is shorter than that at which the particular quantity of images are collected by a single camera, and a probability of an occurrence of hand trembling or object motion within the time interval also correspondingly decreases. Therefore, a synthesized image has better quality.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
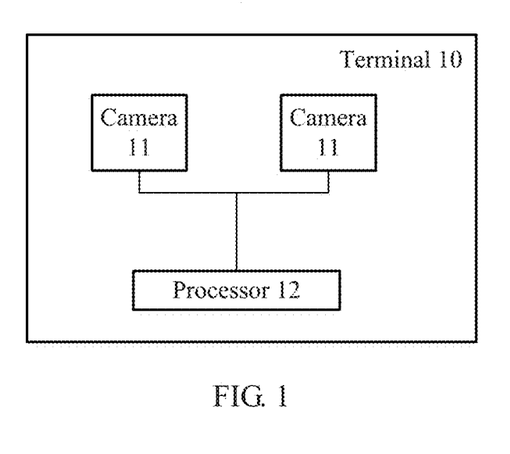
FIG. 1 is a schematic block diagram of a terminal according to an embodiment of the present invention.

FIG. 1 is a schematic block diagram of a terminal according to an embodiment of the present invention. A terminal 10 in FIG. 1 includes M cameras 11, and a processor 12. The M cameras 11 are configured to continuously shoot a same scene for K times, where M≥2, K≥2, and each of the M cameras simultaneously collects one frame of image at each time of shooting. The processor 12 is connected to the M cameras 11 and is configured to perform registration on images obtained at the K times of shooting, and to perform temporal and spatial filtering on the registered images.

In this embodiment of the present invention, multiple cameras are installed on a terminal. Because the multiple cameras simultaneously collect an image at each time of shooting, a time interval at which a particular quantity of images are collected by the terminal is shorter than that at which the particular quantity of images are collected by a single camera, and a probability of an occurrence of hand trembling or object motion within the time interval also correspondingly decreases. Therefore, a synthesized image has better quality in comparison with an image synthesized by multiple frames of images that are collected by the single camera by means of continuous shooting. In addition, this manner also reduces, to some extent, a probability of an occurrence of a ghost phenomenon during subsequent multi-frame noise reduction processing. Further, even though hand trembling or object motion in a scene occurs in a continuous shooting process, because of synchronism of the multiple cameras in image collection at each time of shooting, a phenomenon such as hand trembling or object motion has a consistent effect on the multiple cameras, which ensures, at the source, that the ghost phenomenon does not exist in images that are of continuously shot images and shot at a same moment, thereby reducing, to some extent, severity of the ghost phenomenon in a finally obtained image.

Optionally, in an embodiment, before performing temporal and spatial filtering on the registered images, the processor 12 may be further configured to perform ghost removal on the registered images. When a shooting scene is a movement scene, ghost removal may be performed on the registered images, for example, a moving object may be detected and removed between the images. For details, please refer to an existing ghost removal algorithm. When a stationary scene is shot, ghost removal processing may not be performed. Performing ghost removal on registered images can effectively avoid a ghost phenomenon caused when a moving object intrudes into a shooting scene during shooting, thereby improving quality of a shot image.

It should be understood that values of M and K are not specifically limited in this embodiment of the present invention; for example, M may be 2, 3, 6, or the like, and K may be 2, 3, 4, or the like. Specifically, a relationship between a quantity of cameras and terminal costs may be considered for selection of M. A larger quantity of cameras results in higher corresponding terminal costs and a shorter time interval at which multiple frames of images are shot. In practice, M may be set to 2. A relationship between a quantity of continuously shot images and a time interval required to shoot these images may be considered for selection of K. In practice, K may be set to 3.

That each of the M cameras 11 simultaneously collects one frame of image at each time of shooting may specifically mean that at each time of shooting, each camera of the M cameras 11 collects one frame of image, and M frames of images are collected in total; in addition, times for collecting the M frames of images are the same.

The processor 12 may be an image signal processing (Image Signal Processing, ISP) apparatus, or may be a central processing unit (Central Processing Unit, CPU), or may not only include the ISP apparatus, but also include the CPU, that is, a function of the foregoing processor may be jointly completed by the ISP apparatus and the CPU.

It should be understood that a processing process of the processor 12 is not specifically limited in this embodiment of the present invention. Optionally, in an embodiment, motion estimation and registration may be first performed, by using a camera jitter model, on the images that are shot at the K times of shooting. Alternatively, motion estimation and registration may be performed based on SURF feature point matching and a Homography matrix. Then, temporal filtering may be first performed on the registered images to obtain one frame of image that is generated after temporal noise reduction, and spatial filtering is further performed on the image to obtain and present to a user a final processing result; or spatial filtering is separately performed on the registered images, and images obtained after spatial filtering are synthesized in a temporal filtering manner to obtain a final processing result.

For temporal and spatial filtering noise reduction of an image, refer to the prior art. Specifically, temporal filtering of an image may mean that filtering is performed on corresponding pixels of multiple frames of images by using a temporal correlation between the multiple frames of images. For example, an average or a median of pixel values for continuously shot multiple frames of images, is calculated at a corresponding pixel, or filtering is performed by using a temporal infinite impulse response (Infinite Impulse Response, IIR) filter. Spatial filtering may mean that filtering is performed on pixels of a frame of image by using a spatial correlation between the pixels of the image. For example, first, a spatial template (or referred to as a spatial filter) roams in an image, and a center of the template coincides with a position of a pixel of the image; second, a coefficient in the template and a corresponding pixel value in the image are multiplied; third, all products are added; fourthly, the sum of addition is used as an output response of the template, and is assigned to a pixel corresponding to a center position of the template. The spatial filter may use a filter such as a classic bilateral filter (Bilateral Filter) or non-local means filter (Non-local Means Filter) in the industry.

Figure 2:
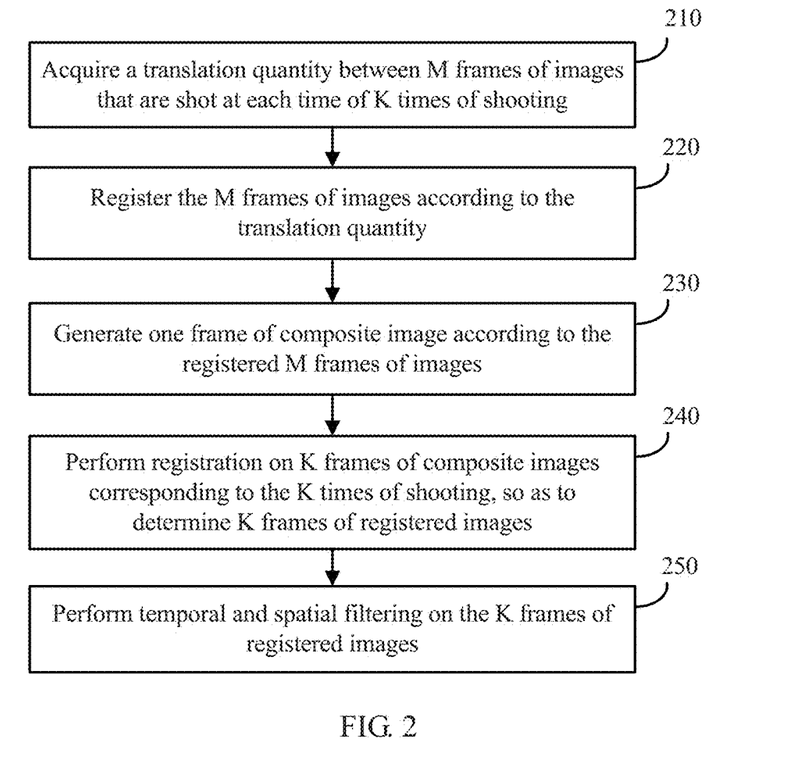
FIG. 2 is a schematic flowchart of a multi-frame noise reduction method according to an embodiment of the present invention.

Optionally, in an embodiment, the M cameras are in a same plane, and a specific processing process of the processor 12 may be as follows:

At 210, a translation quantity between M frames of images that are shot at each time of the K times of shooting is acquired.

At 220, the M frames of images are registered according to the translation quantity.

For example, the M cameras include two cameras, that is, a first camera and a second camera, and the M frames of images that are shot at each time include a first image and a second image that are respectively corresponding to the first camera and the second camera. Step 210 may include: acquiring a translation quantity between the first image and the second image. Step 220 may include: selecting the first image as a reference image, and performing a translation operation on the second image to determine a common image region of the first image and the second image.

Because the two cameras are in the same plane, optical axes of the two cameras are parallel, and relative installation positions are fixed and already known. Therefore, the translation quantity between the first image and the second image may be calculated according to the already known relative positions, that is, the translation quantity may be calculated in advance before the images are shot. Herein, the translation quantity may be obtained in the following manners:

A first manner:

The translation quantity is obtained by using $L=(f\times(t/d))/u$, where:

L is the translation quantity between the first image and the second image; f is a focus length of the first camera or the second camera; t is a distance between optical centers of lenses of the two cameras; d is a pixel size of the first image, and the pixel size of the first image is the same as a pixel size of the second image; and u is a depth of field.

The focus length of the first camera may be the same as the focus length of the second camera, or the focus length of the first camera may be different from the focus length of the second camera.

A second manner:

Because there is usually an error between actual values and theoretical values of t, f, and d, the translation quantity between the first image and the second image may also be calculated by using the following calibration method, which is specifically as follows:

When collecting the first image and the second image, the first camera and the second camera may simultaneously collect a checkerboard, and then content shown in the first image and that shown in the second image are checkerboards. Then, the translation quantity is further measured according to a difference between a checkerboard in the first image and that in the second image. In addition, the measured translation quantity is written into a shooting module configuration table (the shooting module configuration table may be stored in a ROM memory), and the translation quantity between the first image and the second image is read during shooting based on the configuration table.

An advantage of this method lies in that, because inconsistency, that is, an error between actual production and a theoretical design, may exist in different dual camera modules due to mass production, calibration is performed on each dual camera module before factory delivery, which can improve precision of image translation.

At 230, one frame of composite image is registered according to the registered M frames of images.

Optionally, in an embodiment, pixel values for the registered M frames of images and at a corresponding pixel may be averaged, and an image obtained after the corresponding pixel values are averaged is used as the foregoing composite image. Averaging the pixel values for the registered M frames of images and at the corresponding pixel may reduce random noise.

For example, the M cameras include two cameras, that is, a first camera and a second camera, and the M frames of images that are shot at each time include a first image and a second image that are respectively corresponding to the first camera and the second camera. A pixel value that is of a composite image corresponding to each time of shooting and at each point may be obtained by using the following formula:

$$I_{12}(x,y)=(I_1(x,y)+I_2(x,y))/2, \text{ where}$$

$I_1$ (x, y) and $I_2$ (x, y) are pixel values, at a point (x, y), respectively of the first image and the second image that are collected at each time of shooting; $I_{12}$ (x, y) is a pixel value that is of a composite image corresponding to this time of shooting and at the point (x, y).

It should be noted that image synthesis may be performed, according to step 210 to step 230, on the M frames of images that are shot at each time, and K frames of composite images are obtained in total. In addition, processes of performing image synthesis on the M frames of images that are shot at each time may be performed concurrently, or may be performed successively, which is not specifically limited in this embodiment of the present invention.

At 240, registration on K frames of composite images corresponding to the K times of shooting is performed to determine K frames of registered images.

Optionally, in an embodiment, motion estimation may be first performed, by using a camera jitter model, on the K frames of composite images, so as to register the K frames of composite images. Alternatively, motion estimation and registration may be performed based on SURF feature point matching and a Homography matrix.

At 250, temporal and spatial filtering is performed on the K frames of registered images.

For temporal and spatial filtering noise reduction of the K frames of registered images, please refer to the prior art. For example, first, an average or a median of pixel values that are of the K frames of registered images and at a corresponding pixel is calculated, or filtering is performed by using a temporal IIR filter, to obtain a frame of image that is generated after temporal noise reduction; then, filtering is performed, by using a filter such as a classic bilateral filter or non-local means filter in the industry, on the image generated after temporal noise reduction, so as to obtain a final processing result.

In the foregoing technical solution, because relative positions of the M cameras in the same plane are already known, and in addition, the M cameras have synchronism in image collection at each time of shooting, a motion vector between the M frames of images that are shot by the M cameras at each time is translation. A translation quantity between the M frames of images that are shot at each time is acquired, and registration is performed by using the translation quantity, which can speed up a multi-frame noise reduction algorithm, and improve accuracy of the multi-frame noise reduction algorithm, in comparison with a registration algorithm that is in a traditional multi-frame noise reduction algorithm and based on a complex motion estimation model.

Optionally, in an embodiment, step 230 may include: performing parallax correction on the registered M frames of images to eliminate a difference, between the registered M frames of images at a corresponding pixel, caused by a parallax between the M cameras; and generating, according to pixel values that are at the corresponding pixel and of the M frames of images obtained after parallax correction, a pixel value that is of the composite image and at the corresponding pixel. When only a near object or a far object exists in a scene, the step may not be performed. When a near object and a far object simultaneously exist in a scene, because different cameras have different fields of view, a parallax may exist between the different cameras, and image quality can be further improved by eliminating the parallax.

Specifically, the foregoing performing parallax correction on the registered M frames of images may include: when a difference between pixel values, at a corresponding pixel, of a $j^{th}$ frame of image in the registered M frames of images except a benchmark image and of the benchmark image is greater than a preset threshold, using the pixel value that is of the benchmark image and at the corresponding pixel to replace the pixel value that is of the $j^{th}$ frame of image and at the corresponding pixel; otherwise, keeping the pixel value that is of the $j^{th}$ frame of image and at the corresponding pixel unchanged, where the benchmark image is a frame of image in the registered M frames of images, and j is valued from 1 to M−1. It should be understood that any frame of image in the registered M frames of images may be selected as the foregoing benchmark image; for example, the first frame of image in the registered M frames of images may be selected as the foregoing benchmark image.

For example, the M cameras include two cameras, that is, a first camera and a second camera, and the M frames of images that are shot at each time include a first image and a second image that are respectively corresponding to the first camera and the second camera. $I_1$ (x, y) and $I_2$ (x, y) are pixel values that are respectively of registered first image and second image and at a point (x, y). The first image is used as a benchmark image, and a pixel value that is of the second image and at the point (x, y) may be determined by the following formula:

$$I_2(x, y) = \begin{cases} I_1(x, y) & \text{if } |I_2(x, y) - I_1(x, y)| \geq T \\ I_2(x, y) & \text{else} \end{cases},$$

where

T is a preset threshold, where the threshold may be selected according to experience, or may use an adaptive threshold, which is not specifically limited in this embodiment of the present invention.

Figure 3:
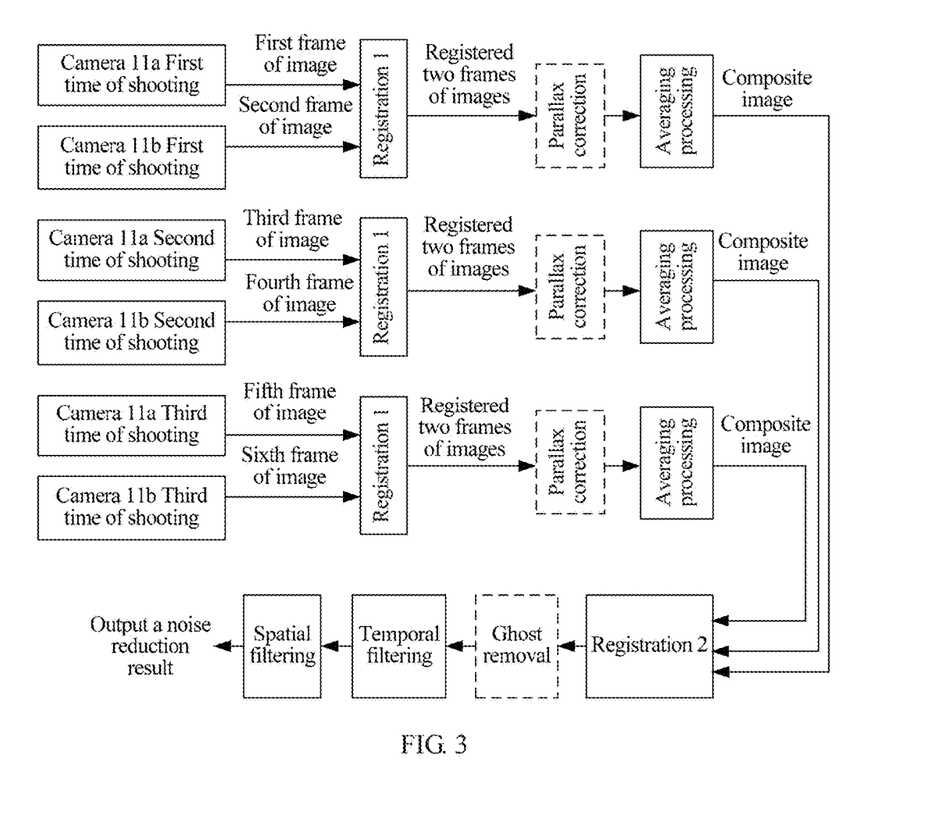
FIG. 3 is a flowchart of a multi-frame noise reduction method according to an embodiment of the present invention.

The following describes a multi-frame noise reduction method in embodiments of the present invention in more detail with reference to specific examples. It should be noted that an example in FIG. 3 is merely intended to help a person skilled in the art understand this embodiment of the present invention, instead of limiting this embodiment of the present invention to a specific value or a specific scenario shown in the example. A person skilled in the art certainly can make various equivalent modifications or changes according to the example listed in FIG. 3, which also fall within the protection scope of the embodiments of the present invention.

FIG. 3 is a schematic flowchart of a multi-frame noise reduction method according to an embodiment of the present invention. In the embodiment in FIG. 3, two cameras (a camera 11a and a camera 11b) are installed on a terminal 10 in a same plane, and continuously perform total three times of shooting, thereby obtaining six frames of images.

First, the camera 11a and the camera 11b respectively collect a first frame of image and a second frame of image at the first time of shooting, the camera 11a and the camera 11b respectively collect a third frame of image and a fourth frame of image at the second time of shooting, and the camera 11a and the camera 11b respectively collect a fifth frame of image and a sixth frame of image at the third time of shooting. It should be noted that the first frame of image, the third frame of image, and the fifth frame of image herein are corresponding to the foregoing first image collected at each time of shooting; the second frame of image, the fourth frame of image, and the sixth frame of image are corresponding to the foregoing second image collected at each time of shooting.

Next, the images that are shot at the three times of shooting are grouped into three groups, where the first frame of image and the second frame of image are in one group, the third frame of image and the fourth frame of image are in one group, and the fifth frame of image and the sixth frame of image are in one group. Then, operations of registration 1, parallax correction, and averaging processing that are show in FIG. 3 are separately performed on the three groups of images. It should be noted that the three groups of images above may be processed concurrently, or may be processed successively, which is not specifically limited in this embodiment of the present invention. The following uses a processing process of the first group of images as an example for description.

First, a translation quantity between the first frame of image and the second frame of image is acquired. Because the two cameras are in the same plane, optical axes of the two cameras are parallel, and relative installation positions are fixed and already known. Therefore, the translation quantity between the first frame of image and the second frame of image may be calculated according to the already known relative positions, that is, the translation quantity may be calculated in advance before the images are shot. Herein, the translation quantity may be obtained in the following manners:

A first manner:

The translation quantity is obtained by using L=(f×(t/d))/u, where:

L is the translation quantity between the first frame of image and the second frame of image; f is a focus length of a first camera or a second camera; t is a distance between optical centers of lenses of the camera 11a and the camera 11b; d is a pixel size of the first frame of image, and the pixel size of the first frame of image is the same as a pixel size of the second frame of image; and u is a depth of field.

A second manner:

Because there is usually an error between actual values and theoretical values of t, f, and d, the translation quantity between the first frame of image and the second frame of image may also be calculated by using the following calibration method, which is specifically as follows:

When collecting the first frame of image and the second frame of image, the camera 11a and the camera 11b may simultaneously collect a checkerboard, and then content shown in the first frame of image and that shown in the second frame of image are checkerboards. Then, the translation quantity is further measured according to a difference between a checkerboard in the first frame of image and that in the second frame of image. In addition, the measured translation quantity is written into a shooting module configuration table (the shooting module configuration table may be stored in a ROM memory), and the translation quantity between the first frame of image and the second frame of image is read during shooting based on the configuration table.

An advantage of this method lies in that, because inconsistency, that is, an error between actual production and a theoretical design, may exist in different dual camera modules due to mass production, calibration is performed on each dual camera module before factory delivery, which improves precision of image translation.

In addition, the first frame of image is selected as a reference image. Registered two frames of images may be obtained after the second frame of image is translated according to the calculated translation quantity, and invalid pixel regions (that is, regions where the first and second frames of images do not coincide after registration) on left and right sides of the first and second frames of images are clipped.

Next, when a near object and a far object both exist in a scene, parallax correction may be performed on the registered two frames of images, so as to compensate for a parallax caused by different installation positions of the camera 11a and the camera 11b. Specifically, the first frame of image is used as the benchmark image, and a pixel value that is of the second frame of image and at a point (x, y) may be determined by using the following formula:

$$I_2(x, y) = \begin{cases} I_1(x, y) & \text{if } |I_2(x, y) - I_1(x, y)| \geq T \\ I_2(x, y) & \text{else} \end{cases},$$

where

T is a preset threshold, where the threshold may be selected according to experience, or may use an adaptive threshold, which is not specifically limited in this embodiment of the present invention.

Then, averaging processing is performed on the registered two frames of images (or two frames of images obtained after parallax correction) to reduce random noise, so as to obtain a composite image corresponding to the first time of shooting. Specifically, a pixel value that is of the composite image corresponding to the first time of shooting and at each point may be obtained by using the following formula:

$$I_{12}(x,y)=(I_1(x,y)+I_2(x,y))/2, \text{ where}$$

$I_1(x, y)$ and $I_2(x, y)$ are pixel values that are respectively of the first frame of image and the second frame of image and at the point (x, y); $I_{12}(x, y)$ is a pixel value that is of the composite image corresponding to the first time of shooting and at the point (x, y). Similarly, composite images corresponding to the second and third times of shooting may be obtained.

Figure 6:
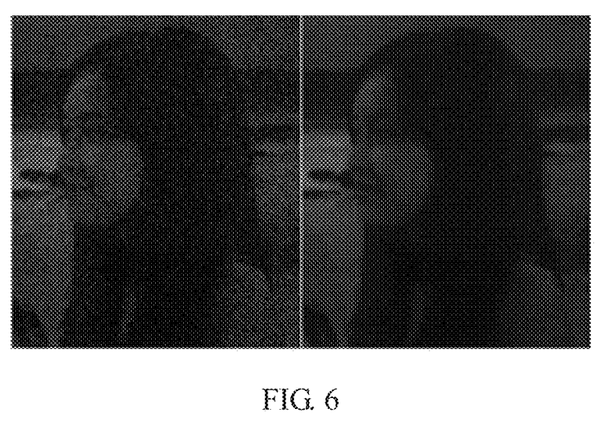
FIG. 6 is a comparison diagram of an original image and a composite image obtained by using a multi-frame noise reduction method according to an embodiment of the present invention.

Next, processing such as registration 2, ghost removal, and temporal and spatial filtering is performed on the three frames of composite images to obtain a final result. For example, motion compensation and registration are first performed on the three frames of composite images by using a camera jitter model. Alternatively, motion compensation and registration may be performed based on SURF feature point matching and a Homography matrix. Then, when a movement scene is shot, ghost removal may be performed on the three registered frames of images. For example, a moving object may be detected and removed between the images. For details, please refer to an existing ghost removal algorithm. When a stationary scene is shot, ghost removal may not be performed. Next, temporal filtering is performed on three frames of images that are obtained after ghost removal. For example, pixel values that are of each pixel and at the three frames of images may be averaged, or filtering is performed on the three frames of images by using a temporal IIR filter. For spatial filtering, a filtering manner such as a classic bilateral filter or non-local means filter in the industry may be used. FIG. 6 is a diagram of effect comparison of a collected original image (on the left of FIG. 6) and an image (on the right of FIG. 6) obtained by means of noise reduction by using a solution in FIG. 3. It can be seen from FIG. 6 that noise existing in the original image is greatly reduced in a composite image obtained by using this embodiment of the present invention.

Figure 4:
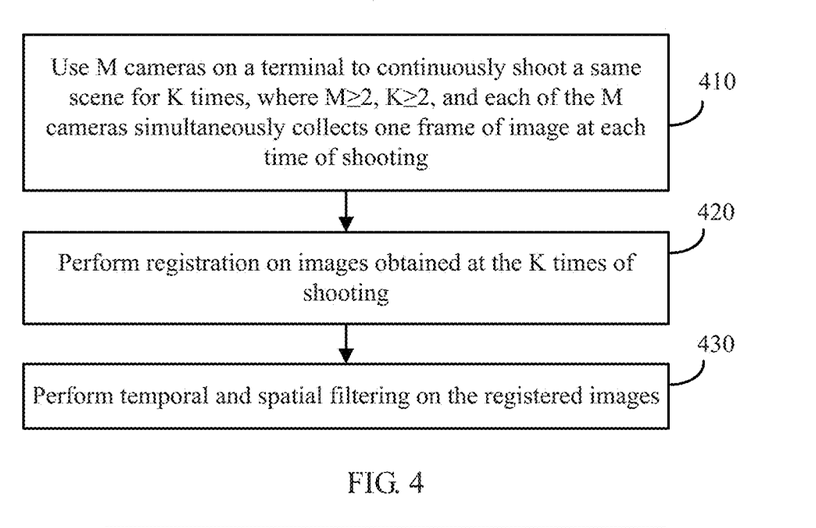
FIG. 4 is a schematic flowchart of a multi-frame noise reduction method according to an embodiment of the present invention.

The following describes a multi-frame noise reduction method according to an embodiment of the present invention in detail with reference to FIG. 4. It should be noted that the multi-frame noise reduction method in FIG. 4 may be executed by the terminal described in FIG. 1 to FIG. 3. A specific procedure of the method is the same as or is corresponding to a processing procedure of the processor of the foregoing terminal, and repeated description is appropriately omitted to avoid repetition.

FIG. 4 is a schematic flowchart of a multi-frame noise reduction method according to an embodiment of the present invention. The method in FIG. 4 includes:

At 410, M cameras on a terminal are used to continuously shoot a same scene for K times, where M≥2, K≥2, and each of the M cameras simultaneously collects one frame of image at each time of shooting.

At 420, registration on images obtained at the K times of shooting is performed.

At 430, temporal and spatial filtering on the registered images is performed.

In this embodiment of the present invention, multiple cameras are installed on a terminal. Because the multiple cameras simultaneously collect an image at each time of shooting, a time interval at which a particular quantity of images are collected by the terminal is shorter than that at which the particular quantity of images are collected by a single camera, and a probability of an occurrence of hand trembling or object motion within the time interval also correspondingly decreases. Therefore, a synthesized image has better quality in comparison with an image synthesized by multiple frames of images that are collected by the single camera by means of continuous shooting. In addition, this manner also reduces, to some extent, a probability of an occurrence of a ghost phenomenon during subsequent multi-frame noise reduction processing. Further, even though hand trembling or object motion in a scene occurs in a continuous shooting process, because of synchronism of the multiple cameras in image collection at each time of shooting, a phenomenon such as hand trembling or object motion has a consistent effect on the multiple cameras, which ensures, at the source, that the ghost phenomenon does not exist in images that are of continuously shot images and shot at a same moment, thereby reducing, to some extent, severity of the ghost phenomenon in a finally obtained image.

Optionally, in an embodiment, the M cameras are in a same plane; before the performing registration on images obtained at the K times of shooting, the method illustrated in FIG. 4 may further include: acquiring a translation quantity between M frames of images that are shot at each time of the K times of shooting, registering the M frames of images according to the translation quantity, and generating one frame of composite image according to the registered M frames of images. In that embodiment, performing registration on images obtained at the K times of shooting includes: performing the registration on K frames of composite images corresponding to the K times of shooting to determine K frames of registered images. In that embodiment, performing temporal and spatial filtering on the registered images includes: performing the temporal and spatial filtering on the K frames of registered images.

Optionally, in an embodiment, the M cameras include a first camera and a second camera, and the M frames of images that are shot at each time include a first image and a second image respectively corresponding to the first camera and the second camera. In that embodiment, acquiring the translation quantity between M frames of images that are shot at each time of the K times of shooting includes: acquiring a translation quantity between the first image and the second image; and registering the M frames of images according to the translation quantity includes: selecting the first image as a reference image, and performing a translation operation on the second image according to the translation quantity to determine a common image region of the first image and the second image.

In the foregoing technical solution, because relative positions of the M cameras in the same plane are already known, and in addition, the M cameras have synchronism in image collection at each time of shooting, a motion vector between the M frames of images that are shot by the M cameras at each time is translation. A translation quantity between the M frames of images that are shot at each time is acquired, and registration is performed by using the translation quantity, which can speed up a multi-frame noise reduction algorithm, and improve accuracy of the multi-frame noise reduction algorithm, in comparison with a registration algorithm that is in a traditional multi-frame noise reduction algorithm and based on a complex motion estimation model.

Optionally, in an embodiment, the acquiring a translation quantity between the first image and the second image includes: obtaining the translation quantity based on L=(f×(t/d))/u, where L is the translation quantity between the first image and the second image; f is a focus length of the first camera or the second camera; t is a distance between optical centers of a lens of the first camera and a lens of the second camera; d is a pixel size of the first image, and the pixel size of the first image is the same as a pixel size of the second image; and u is a depth of field.

Optionally, in an embodiment, generating one frame of composite image according to the registered M frames of images includes: performing parallax correction on the registered M frames of images, so as to eliminate a difference, between the registered M frames of images at a corresponding pixel, caused by a parallax between the M cameras; and generating, according to pixel values that are at the corresponding pixel and of the M frames of images obtained after parallax correction, a pixel value that is of the composite image and at the corresponding pixel.

Optionally, in an embodiment, performing parallax correction on the registered M frames of images includes: when a difference between pixel values, at a corresponding pixel, of a $j^{th}$ frame of image in the registered M frames of images except a benchmark image and of the benchmark image is greater than a preset threshold, using the pixel value that is of the benchmark image and at the corresponding pixel to replace the pixel value that is of the $j^{th}$ frame of image and at the corresponding pixel; otherwise, keeping the pixel value that is of the $j^{th}$ frame of image and at the corresponding pixel unchanged, where the benchmark image is a frame of image in the registered M frames of images, and j is valued from 1 to M−1.

Optionally, in an embodiment, before the performing temporal and spatial filtering on the registered images, the method further includes: performing ghost removal on the registered images.

Optionally, in an embodiment, K=3.

Figure 5:
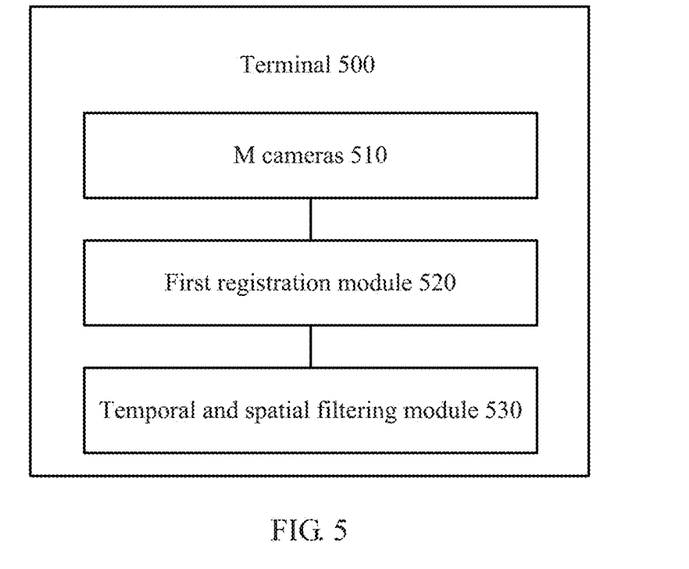
FIG. 5 is a schematic block diagram of a terminal according to an embodiment of the present invention.

The following describes a terminal according to an embodiment of the present invention in detail with reference to FIG. 5. The terminal can implement steps in the foregoing multi-frame noise reduction method, and repeated description is omitted to avoid repetition.

FIG. 5 is a schematic block diagram of a terminal according to an embodiment of the present invention. A terminal 500 in FIG. 5 includes: M cameras 510, a first registration module 520, and a temporal and spatial filtering module 530.

The M cameras 510 are configured to continuously shoot a same scene for K times, where M≥2, K≥2, and each of the M cameras simultaneously collects one frame of image at each time of shooting.

The first registration module 520 is configured to perform registration on images obtained by the M cameras 510 at the K times of shooting.

The temporal and spatial filtering module 530 is configured to perform temporal and spatial filtering on the images registered by the first registration module 520.

In this embodiment of the present invention, multiple cameras are installed on a terminal. Because the multiple cameras simultaneously collect an image at each time of shooting, a time interval at which a particular quantity of images are collected by the terminal is shorter than that at which the particular quantity of images are collected by a single camera, and a probability of an occurrence of hand trembling or object motion within the time interval also correspondingly decreases. Therefore, a synthesized image has better quality in comparison with an image synthesized by multiple frames of images that are collected by the single camera by means of continuous shooting. In addition, this manner also reduces, to some extent, a probability of an occurrence of a ghost phenomenon during subsequent multi-frame noise reduction processing. Further, even though hand trembling or object motion in a scene occurs in a continuous shooting process, because of synchronism of the multiple cameras in image collection at each time of shooting, a phenomenon such as hand trembling or object motion has a consistent effect on the multiple cameras, which ensures, at the source, that the ghost phenomenon does not exist in images that are of continuously shot images and shot at a same moment, thereby reducing, to some extent, severity of the ghost phenomenon in a finally obtained image.

Optionally, in an embodiment, the M cameras are in a same plane, and the terminal further includes: a second registration module, configured to acquire a translation quantity between M frames of images that are shot at each time of the K times of shooting, and register the M frames of images according to the translation quantity; and a synthesizing module, configured to generate one frame of composite image according to the M frames of images registered by the second registration module, where the first registration module is specifically configured to perform the registration on K frames of composite images corresponding to the K times of shooting, so as to determine K frames of registered images; and the temporal and spatial filtering module is specifically configured to perform the temporal and spatial filtering on the K frames of registered images.

In the foregoing technical solution, because relative positions of the M cameras in the same plane are already known, and in addition, the M cameras have synchronism in image collection at each time of shooting, a motion vector between the M frames of images that are shot by the M cameras at each time is translation. A translation quantity between the M frames of images that are shot at each time is acquired, and registration is performed by using the translation quantity, which can speed up a multi-frame noise reduction algorithm, and improve accuracy of the multi-frame noise reduction algorithm, in comparison with a registration algorithm that is in a traditional multi-frame noise reduction algorithm and based on a complex motion estimation model.

Optionally, in an embodiment, the M cameras include a first camera and a second camera, and the M frames of images that are shot at each time include a first image and a second image that are respectively corresponding to the first camera and the second camera. The second registration module is further configured to: acquire a translation quantity between the first image and the second image, select the first image as a reference image, and perform a translation operation on the second image according to the translation quantity to determine a common image region of the first image and the second image.

Optionally, in an embodiment, the second registration module is further configured to obtain the translation quantity based on $L=(f\times(t/d))/u$, where L is the translation quantity between the first image and the second image; f is a focus length of the first camera or the second camera; t is a distance between optical centers of a lens of the first camera and a lens of the second camera; d is a pixel size of the first image, and the pixel size of the first image is the same as a pixel size of the second image; and u is a depth of field.

Optionally, in an embodiment, the synthesizing module is further configured to perform parallax correction on the registered M frames of images, so as to eliminate a difference, between the registered M frames of images at a corresponding pixel, caused by a parallax between the M cameras; and generate, according to pixel values that are at the corresponding pixel and of the M frames of images obtained after parallax correction, a pixel value that is of the composite image and at the corresponding pixel.

Optionally, in an embodiment, the synthesizing module is further configured to: when a difference between pixel values, at a corresponding pixel, of a $j^{th}$ frame of image in the registered M frames of images except a benchmark image and of the benchmark image is greater than a preset threshold, use the pixel value that is of the benchmark image and at the corresponding pixel to replace the pixel value that is of the $j^{th}$ frame of image and at the corresponding pixel; otherwise, keep the pixel value that is of the $j^{th}$ frame of image and at the corresponding pixel unchanged, where the benchmark image is a frame of image in the registered M frames of images, and j is valued from 1 to M−1.

Optionally, in an embodiment, the terminal further includes a ghost removal module, configured to perform ghost removal on the registered images.

Optionally, in an embodiment, K=3.

It can be understood that temporal filtering in the foregoing embodiment may be performing noise reduction by using a temporal correlation between the M cameras at each time of shooting. Spatial filtering may be performing noise reduction by using a correlation between neighboring pixels.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multi-frame noise reduction method, comprising:
   using M cameras on a terminal to continuously shoot a same scene for K times, wherein M≥2, K≥2, and each of the M cameras simultaneously collects one frame of image at each time of shooting;
   for each time of the shooting in the K times:
      registering M frames collected by the M cameras; and
      generating a composite frame from the registered M frames based on shift amounts among locations of the M cameras to generate K composite frames;
   registering the K composite frames; and
   performing temporal and spatial filtering on the registered composite K frames.

2. The method according to claim 1, wherein the M cameras are in a same plane; and, wherein
   the method further comprises:
   acquiring a translation quantity between M frames of images shot at each of the K times; and, wherein
   registration of the M frames of images is according to the translation quantity.

3. The method according to claim 2, wherein the M cameras comprise a first camera and a second camera, and the M frames of images shot at each of the K times comprise a first image and a second image respectively corresponding to the first camera and the second camera;
   acquiring the translation quantity between the M frames of images shot at each of the K times comprises:
      acquiring a translation quantity between the first image and the second image; and registering the M frames of images according to the translation quantity comprises:
      selecting the first image as a reference image; and
   performing a translation operation on the second image according to the translation quantity to determine a common image region of the first image and the second image.

4. The method according to claim 3, wherein:
   acquiring the translation quantity between the first image and the second image comprises:
   obtaining the translation quantity based on $L=(f\times(t/d))/u$, wherein
      L is the translation quantity between the first image and the second image;
      f is a focus length of the first camera or the second camera;
      t is a distance between optical centers of a lens of the first camera and a lens of the second camera;
      d is a pixel size of the first image, and the pixel size of the first image is the same as a pixel size of the second image; and
      u is a depth of field.

5. The method according to claim 2, wherein:
   generating one frame of composite image according to the registered M frames of images comprises:
   performing parallax correction on the registered M frames of images to eliminate a difference in pixel value, between the registered M frames of images at a corresponding pixel, caused by a parallax between the M cameras; and
   generating, according to pixel values that are at the corresponding pixel and of the M frames of images obtained after parallax correction, a pixel value that is of the composite image and at the corresponding pixel.

6. The method according to claim 5, wherein performing parallax correction on the registered M frames of images comprises:
   when a difference between pixel values, at a corresponding pixel, of a $j^{th}$ frame of image in the registered M frames of images except a benchmark image and of the benchmark image is greater than a preset threshold, using the pixel value that is of the benchmark image and at the corresponding pixel to replace the pixel value that is of the $j^{th}$ frame of image and at the corresponding pixel; and when the difference between the pixel values, at the corresponding pixel, of the $j^{th}$ frame of image except the benchmark image in the registered M frames of images and of the benchmark image is not greater than the preset threshold, keeping the pixel value that is of the $j^{th}$ frame of image and at the corresponding pixel unchanged, wherein the benchmark image is a frame of image in the registered M frames of images, and j is valued from 1 to M−1.

7. The method according to claim 1, wherein:

before performing temporal and spatial filtering on the registered composite K frames, the method further comprises:

performing ghost removal on the registered composite K frames.

8. The method according to claim 1, wherein K=3.

9. A terminal, comprising:

M cameras, configured to continuously shoot a same scene for K times, wherein M≥2, K≥2, and each of the M cameras simultaneously collects one frame of image at each time of shooting; and a processor, connected to the M cameras and configured to:
  for each time of the shooting in the K times:
    register M frames collected by the M cameras; and
    generate a composite frame from the registered M frames based on shift amounts among locations of the M cameras to generate K composite frames;
  register the K composite frames; and
  perform temporal and spatial filtering on the registered composite K frames.

10. The terminal according to claim 9, wherein the M cameras are in a same plane; and, wherein the processor is further configured to:

acquire a translation quantity between M frames of images shot at each of the K times; and, wherein registration of the M frames of images is according to the translation quantity.

11. The terminal according to claim 10, wherein the M cameras comprise a first camera and a second camera, and the M frames of images that are shot at each of the K times comprise a first image and a second image respectively corresponding to the first camera and the second camera; and, wherein acquiring a translation quantity between M frames of images that are shot at each time of the K times comprises:

acquiring a translation quantity between the first image and the second image; and registering the M frames of images according to the translation quantity comprises:

selecting the first image as a reference image; and performing a translation operation on the second image according to the translation quantity to determine a common image region of the first image and the second image.

12. The terminal according to claim 11, wherein:

acquiring the translation quantity between the first image and the second image comprises that the processor is further configured to:

obtain the translation quantity based on $L=(f \times (t/d))/u$, wherein

L is the translation quantity between the first image and the second image;

f is a focus length of the first camera or the second camera;

t is a distance between optical centers of a lens of the first camera and a lens of the second camera;

d is a pixel size of the first image, and the pixel size of the first image is the same as a pixel size of the second image; and u is a depth of field.

13. The terminal according to claim 10, wherein:

generating one frame of composite image according to the registered M frames of images comprises:

performing parallax correction on the registered M frames of images, so as to eliminate a difference in pixel value, between the registered M frames of images at a corresponding pixel, caused by a parallax between the M cameras; and generating, according to pixel values that are at the corresponding pixel and of the M frames of images obtained after parallax correction, a pixel value that is of the composite image and at the corresponding pixel.

14. The terminal according to claim 13, wherein performing parallax correction on the registered M frames of images comprises:

when a difference between pixel values, at a corresponding pixel, of a $j^{th}$ frame of image in the registered M frames of images except a benchmark image and of the benchmark image is greater than a preset threshold, use the pixel value that is of the benchmark image and at the corresponding pixel to replace the pixel value that is of the $j^{th}$ frame of image and at the corresponding pixel; and when the difference between the pixel values, at the corresponding pixel, of the $j^{th}$ frame of image except the benchmark image in the registered M frames of images and of the benchmark image is not greater than the preset threshold, keep the pixel value that is of the $j^{th}$ frame of image and at the corresponding pixel unchanged, wherein the benchmark image is a frame of image in the registered M frames of images, and j is valued from 1 to M−1.

15. The terminal according to claim 9, wherein:

before performing temporal and spatial filtering on the registered composite K frames, the processor is further configured to:

perform ghost removal on the registered composite K frames.

16. The terminal according to claim 9, wherein K=3.

* * * * *